United States Patent Office 2,993,334
Patented July 25, 1961

2,993,334
IGNITION DELAY REDUCING AGENTS FOR HYPERGOLIC ROCKET FUELS
Joe M. Burton, McGregor, Tex., assignor to Phillips Petroleum Company, a corporation of Delaware
No Drawing. Filed Aug. 2, 1954, Ser. No. 447,413
18 Claims. (Cl. 60—35.4)

This invention relates to improved hypergolic rocket fuels. In one of its more specific aspects. it relates to additives for reducing the ignition delay of hypergolic fuels. In another of its more specific aspects it relates to additives for improving combustion stability and combustion efficiency of both hypergolic and non-hypergolic fuels.

The propelling action of a rocket motor is derived from the generation of large quantities of gases by the chemical reaction of suitable propellants within the rocket motor. The propellants employed in a rocket motor may be a solid or a liquid monopropellant (materials containing an adequate supply of available oxygen in their chemical composition), or two liquids (fuel plus oxidizer).

The principal elements of a bipropellant liquid-rocket engine are a combustion chamber, exhaust nozzle, propellant injection system, fuel tank, oxidant tank, and control valves. The fuel and oxidant react in the combustion chamber to form high temperature gases at pressures governed by the nozzle throat area, rate of propellant consumption, ratio of fuel to oxidant, and the efficiency of conversion. Combustion temperature and thus pressure are also functions of the fuel and oxidant used. These high temperature gases are accelerated by a nozzle to a very high velocity (usually in excess of 4000 ft./sec.). The reaction force resultant to this gas acceleration provides thrust to drive the rocket.

The injection system through which the liquid propellants (fuel and oxidant) flow into the combustion chamber is usually designed to mix the propellants as they enter. The reaction of the fuel and oxidant may be enhanced by atomization accompanied by pressure drop through the nozzle or by impingement of the fuel and oxidant streams, or it may be desirable to prevent substantial atomization depending on the engine and propellant system used. To start the operation of the rocket motor an electric igniter is necessary with some propellants, but propellants which ignite spontaneously on contact with each other are most frequently employed and are preferred. These propellant fuels which ignite spontaneously on contact with the oxidizer are called hypergolic fuels. It is desirable that the fuel ignite as soon as possible upon contact in order to prevent the build up of excess fuel in the combustion chamber prior to ignition.

It is generally recognized that the starting characteristics of liquid propellant rockets are affected by the ignition delay of the propellant systems employed. The actual mechanism of the ignition of spontaneous liquid propellants is difficult to determine. In the case of actual motor operations the conditions are complicated by physical factors such as injection pressures, mixing parameters, chamber dimensions, and other factors which may mask the purely chemical factors involved. The chemical factors involved in ignition with propellant systems employing nitric acid as the oxidizer may be broken down as follows: neutralization reactions, nitration reactions, and oxidation reactions. These reactions may occur singly or simultaneously in either the vapor or the liquid phase.

Each of the following objects will be attained by the aspects of the invention.

It is an object of this invention to provide means for reducing the ignition delay of hypergolic rocket propellants.

It is another object of this invention to provide agents for accelerating the spontaneous combustion of strong oxidizers such as fuming nitric acid and compounds hypergolic therewith.

It is a further object to provide a modified nitric acid oxidizer for initiating instantaneous ignition with rocket fuels.

It is still another object to provide a novel liquid rocket fuel which produces instantaneous and smooth ignition with fuming nitric acid.

Thus it is an object of this invention to provide means for eliminating the explosion hazard which results from tardy ignition of propellant in a rocket motor.

It is also an object of the invention to provide agents for increasing combustion stability and combustion efficiency of fuels oxidized with strong oxidizers such as nitric acid.

It is a further object to provide a modified nitric acid oxidizer for improving combustion characteristics of fuels oxidized thereby.

Other objects and advantages of this invention will be apparent to one skilled in the art upon reading the disclosure of this invention.

I have discovered that the spontaneous ignition of hypergolic rocket fuels with oxidizing agents is accelerated in the presence of small additions of oxygen-containing metal compounds selected from the group consisting of vanadium pentoxide, sodium zirconium silicate, sodium titanium silicate, potassium ammonium sulfate, silver nitrate, potassium pyroantimonate, and tantalum pentoxide.

I have also discovered that these oxygen-containing metal compounds improve combustion characteristics of both hypergolic and non-hypergolic fuels and an oxidant such as nitric acid by increasing combustion stability and combustion efficiency.

These agents can be used with white fuming nitric acid (WFNA), red fuming nitric acid (RFNA), or other oxidizers used with fuels hypergolic with such oxidizer. These agents can be added to the fuel component of a bipropellant or to the oxidizer component, however, I prefer to add the agents to the oxidizer particularly in those instances where the oxidizer and a hypergolic fuel are used for initiating combustion and other fuels are used after ignition has been initiated, so as to obtain the benefits of increased combustion stability and increased combustion efficiency provided by the combustion accelerator agents. It may be preferable to add the ignition delay agent to the hypergolic fuel where ignition is initiated by the oxidizer and a hypergolic fuel and combustion is continued, after ignition is initiated, with the same oxidizer and a fuel not hypergolic with an oxidizer in those instances where the non-hypergolic fuel already contains an agent for increasing combustion stability and combustion efficiency and in those instances where the combustion stability and combustion efficiency of the non-hypergolic fuel does not require improvement.

The optimum amount of ignition delay agent for use with a fuel and oxidizer can readily be determined by routine tests. The amount of ignition delay agent will usually be between 0.1 and 10 weight percent based on the liquid hypergolic fuel component and is preferably between 1 and 5 weight percent. The above ranges of additive are also applicable for increasing combustion efficiency and combustion stability of non-hypergolic fuel and oxidizer systems. The preferred range being between 1 and 5 weight percent of additive based on the non-hypergolic fuel component.

The oxidizers preferred in the practice of the invention are white fuming nitric acid containing a maximum of about 2 percent by weight of water and red fuming nitric acid containing 5 weight percent of water. Nitric acid containing at least 80 percent $HNO_3$ can be used as an oxidizer. Liquid nitrogen dioxide, liquid hydrogen peroxide, liquid oxygen and other strong oxidizing agents also can be used as oxidizers when the fuel used is hypergolic with the oxidizer.

There are many hypergolic fuels available, while the following list is not intended to be exhaustive it will illustrate the wide variety of materials which have the property of spontaneous combustion on being contacted with strong oxidizers such as fuming nitric acids. These materials include unsaturated hydrocarbons of the acetylene and diolefin series, for example, divinyl acetylene, dipropargyl, propargyl alcohol, 2-methyl-1,3-butadiene and dicyclopentadiene; nitrogen-containing petroleum derivatives, for example, diallylamine, 1,3-diaminobutane, 2-amino-5-diethylaminopentane, phenetidine, and pyrrole; sulfur-containing petroleum derivatives, for example, normal butyl mercaptan, divinyl sulfide and diallyl sulfide; petroleum derivatives containing both sulfur and nitrogen, for example, N-methylethylsulfenamide, 2-aminothiophenol and N-methyl-tertiary-butylsulfenamide; oxygen-containing petroleum derivatives, for example, 2-methoxybutadiene, geraniol, linallol, 2-methylfuran and furfuryl alcohol; combustible liquid slurries of elements such as potassium and sodium; for example, dispersions of sodium in ether; liquid hydrides of metals, for example, pentaborane ($B_5H_9$); liquid organometallic compounds such as aluminum triethyl; liquid fuels containing sodium or potassium in solution, for example, sodium dissolved in xylene; and liquid fuels containing sodium or potassium in suspension, for example, dispersions of sodium in gasoline.

Hypergolic fuels can be used alone or in conjunction with other liquid fuels such as petroleum oils. Usually the hypergolic fuel and the fuel oil will be mixed prior to entering the combustion chamber, however, they can enter by separate streams. In such mixtures, sufficient hypergolic fuel will be used to insure spontaneous ignition.

Examples of non-hypergolic fuel and oxidizer systems include strong oxidizers such as fuming nitric acids and hydrocarbon fuels such as gasoline, and diesel fuel. Non-hypergolic fuel and oxidizer systems also include strong oxidizers such as fuming nitric acids and liquid petroleum derivatives such as monopropellents, for example, mixtures of nitric acid and nitromethane.

In the following examples the drop test method for evaluating hypergolic fuels was used. The drop test apparatus comprises an injection nozzle controlled by a solenoid operated pintle valve which injects the oxidizer into a small quantity of fuel contained in the bottom of a test tube. The ignition delay is determined as the time interval between contact of the oxidizer and fuel and the presence of flame as sensed by a photocell.

The apparent solubilities of the additives in the oxidizer and in the fuel were determined by adding weighed amounts of additive to a measured weight of fuel or oxidizer and stirring the mixture to accelerate solution of the additive. Apparent solubility was determined on the basis of undissolved additive.

EXAMPLES

In a series of runs employing the drop test apparatus described above the ignition delay agents of this invention were used in solution in representative hypergolic fuels and oxidizers and results of these runs are shown in Tables I, II and III.

In Table IV is shown the ignition delay, in milliseconds of the hypergolic fuels tested, and the values in this table represent the 100 percent of ignition delay in Tables I, II, and III.

*Table I*

EFFECT OF ADDITIVE IN WFNA ON IGNITION DELAY

| Additive, 3 Wt. Percent | Percent of Ignition Delay | | |
|---|---|---|---|
| | Diallyl Sulfide | Diallyl-amine | Furfuryl Alcohol |
| None | 100 | 100 | 100 |
| Vanadium Pentoxide | 86 | 48 | 43 |
| Sodium Titanium Silicate | 86 | 79 | 64 |
| Sodium Zirconium Silicate | 95 | 77 | 47 |
| Tantalum Pentoxide | 86 | 102 | 82 |

*Table II*

EFFECT OF ADDITIVE IN RFNA ON IGNITION DELAY

| Additive, 3 Wt. Percent | Percent of Ignition Delay | | |
|---|---|---|---|
| | Diallyl Sulfide | Diallyl-amine | Furfuryl Alcohol |
| None | 100 | 100 | 100 |
| Vanadium Pentoxide | 83 | 52 | 73 |
| Silver Nitrate | 83 | 83 | 83 |
| Potassium Ammonium Sulfate | 113 | 71 | 66 |
| Potassium Pyroactimonate | 135 | 77 | 49 |

*Table III*

EFFECT OF ADDITIVE IN FUEL ON IGNITION DELAY WITH WFNA

| Additive, 3 Wt. Percent | Percent of Ignition Delay | | |
|---|---|---|---|
| | Diallyl Sulfide | Diallyl-amine | Furfuryl Alcohol |
| None | 100 | 100 | 100 |
| Vanadium Pentoxide | 88 | 50 | 47 |
| Sodium Zirconium Silicate | 97 | 78 | 51 |
| Sodium Titanium Silicate | 87 | 80 | 74 |

*Table IV*

IGNITION DELAY OF FUELS UNDER CONDITIONS OF TESTING PROCEDURE AT 75° F.

| Fuel | Ignition Delay in Milliseconds | |
|---|---|---|
| | WFNA Oxidizer | RFNA Oxidizer |
| Diallyl Sulfide | 21 | 23 |
| Diallylamine | 66 | 66 |
| Furfuryl Alcohol | 28 | 41 |

These examples show that the oxygen-containing metal compounds of this invention will accelerate spontaneous combustion of a fuel and simple routine tests will determine the proper oxygen-containing metal compound for use with any particular fuel and oxidizer combination.

Variations and modifications are possible within the scope of the invention, the essence of which is that certain oxygen-containing metal compounds have been found to accelerate spontaneous combustion of hypergolic fuels and oxidizer and to improve combustion stability and combustion efficiency of non-hypergolic fuels when oxidized by strong oxidizers such as nitric acid.

That which is claimed is:

1. The method of accelerating spontaneous combustion of a hypergolic fuel and fuming nitric acid which consists of contacting hypergolic proportions of said acid with a hypergolic fuel selected from the group consisting of diallyl sulfide, diallylamine, and furfuryl alcohol in the presence of 1 to 5 weight percent of said fuel of an oxygen containing metal compound selected from the group consisting of vanadium pentoxide, sodium zirconium silicate, sodium titanium silicate, potassium ammonium sulfate, silver nitrate, potassium pyroantimonate, and tantalum pentoxide in the combustion chamber of a rocket motor.

2. The method of claim 1 wherein the oxygen-containing metal compound is vanadium pentoxide.

3. The method of claim 1 wherein the oxygen-containing metal compound is sodium zirconium silicate.

4. The method of claim 1 wherein the oxygen-containing metal compound is sodium titanium silicate.

5. The method of claim 1 wherein the oxygen-containing metal compound is potassium ammonium sulfate.

6. The method of claim 1 wherein the oxygen-containing metal compound is silver nitrate.

7. The method of claim 1 wherein the oxygen-containing metal compound is potassium pyroantimonate.

8. The method of claim 1 wherein the oxygen-containing metal compound is tantalum pentoxide.

9. The method of accelerating spontaneous combustion in a reaction motor which comprises bringing together in the combustion zone of said motor fuming nitric acid; a fuel selected from the group consisting of diallyl sulfide, diallylamine, and furfuryl alcohol; and an oxygen-containing metal compound selected from the group consisting of vanadium pentoxide, sodium zirconium silicate, sodium titanium silicate, potassium ammonium sulfate, silver nitrate, potassium pyroantimonate, and tantalum pentoxide.

10. A hypergolic fuel composition selected from the group consisting of diallyl sulfide, diallylamine, and furfuryl alcohol; and from 1 to 5 percent of an oxygen containing metal compound selected from the group consisting of vanadium pentoxide, sodium zirconium silicate, sodium titanium silicate, potassium ammonium sulfate, silver nitrate, potassium pyroantimonate, and tantalum pentoxide.

11. The composition of claim 10 wherein the oxygen-containing compound is vanadium pentoxide.

12. The composition of claim 10 wherein the oxygen-containing compound is sodium zirconium silicate.

13. The composition of claim 10 wherein the oxygen-containing compound is sodium titanium silicate.

14. The composition of claim 10 wherein the oxygen-containing compound is potassium ammonium sulfate.

15. The composition of claim 10 wherein the oxygen-containing compound is silver nitrate.

16. The composition of claim 10 wherein the oxygen-containing compound is potassium pyroantimonate.

17. The composition of claim 10 wherein the oxygen-containing compound is tantalum pentoxide.

18. In the operation of a reaction motor wherein combustion is initiated by contacting hypergolic proportions of fuming nitric acid and a fuel selected from the group consisting of diallyl sulfide, diallylamine, and furfuryl alcohol and combustion is continued by oxidation of said fuel with said acid the improvement which comprises the steps of accelerating initiation of said combustion and increasing combustion stability and combustion efficiency by conducting said steps in the presence of 1 to 5 weight percent of fuel of an oxygen containing metal compound selected from the group consisting of vanadium pentoxide, sodium zirconium silicate, sodium titanium silicate, potassium ammonium sulfate, silver nitrate, potassium pyroantimonate, and tantalum pentoxide.

References Cited in the file of this patent

UNITED STATES PATENTS

| | | |
|---|---|---|
| 2,573,471 | Malina et al. | Oct. 30, 1951 |
| 2,637,161 | Tschinkel | May 5, 1953 |
| 2,637,274 | Taylor et al. | May 5, 1953 |
| 2,682,461 | Hutchison | June 29, 1954 |

OTHER REFERENCES

Levy: Chimie & Industrie, vol. 57, No. 3, March 1947, pages 221–227 inclusive. (Copy in Scientific Library.)

Gunn: Journal of the American Rocket Society, No. 22, January-February 1952, pages 33–38 inclusive. (Copy in Scientific Library.)